US012267666B1

(12) United States Patent
Pinto et al.

(10) Patent No.: US 12,267,666 B1
(45) Date of Patent: Apr. 1, 2025

(54) AUDIO-BASED PRESENCE DETECTION

(71) Applicant: Apple Inc., Cupertino, CA (US)

(72) Inventors: Stephen E. Pinto, Sunnyvale, CA (US); Chad Himeda, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/497,949

(22) Filed: Oct. 30, 2023

Related U.S. Application Data

(63) Continuation of application No. 17/481,844, filed on Sep. 22, 2021, now Pat. No. 11,805,381, which is a continuation of application No. 16/870,752, filed on May 8, 2020, now Pat. No. 11,146,909.

(60) Provisional application No. 62/850,332, filed on May 20, 2019.

(51) Int. Cl.
*H04S 7/00* (2006.01)
*G10L 25/06* (2013.01)
*H04R 1/10* (2006.01)

(52) U.S. Cl.
CPC .............. *H04S 7/304* (2013.01); *G10L 25/06* (2013.01); *H04R 1/1091* (2013.01); *H04R 2460/13* (2013.01)

(58) Field of Classification Search
None
See application file for complete search history.

(56) References Cited

U.S. PATENT DOCUMENTS 7,668,964 B2 2/2010 Millington
9,912,373 B1 3/2018 Wang
11,146,909 B1 10/2021 Pinto et al.
11,190,899 B2 11/2021 Stringer et al.
11,805,381 B2 10/2023 Pinto et al.
2002/0126855 A1 9/2002 Terada et al.
2013/0230086 A1 9/2013 Sorensen
2013/0251169 A1 9/2013 Awano et al.
2014/0161270 A1 6/2014 Peters et al.
2014/0354441 A1 12/2014 Luna
2018/0183881 A1 6/2018 Lewis et al.
2021/0297518 A1 9/2021 Keum et al.

FOREIGN PATENT DOCUMENTS

CN 112969096 6/2021
JP 6601030 B2 11/2019

OTHER PUBLICATIONS

Notice of Allowance, U.S. Appl. No. 16/870,752, Jun. 14, 2021, 8 pages.
Leif Johnson, "How to hand off music or phone calls from your iPhone to a HomePod", received from https://www.macworld.com/article/233474/how-to-hand-off-music-or-phone-calls-from-your-iphone-to-a-homepod.html, Oct. 31, 2019, 6 pages.
Marc DeAngelis, "Spotify tests simplified speaker handoff feature", received from https://www.engadget.com/2019-08-13-spotify-tests-simplified-speaker-handoff-feature.html, Aug. 13, 2019, 1 page.

*Primary Examiner* — Kenny H Truong
(74) *Attorney, Agent, or Firm* — Aikin & Gallant, LLP

(57) ABSTRACT

A device can receive an audio signal and determine a measure of correlation between the audio signal and a microphone signal. The audio signal can be attenuated based on the measure of correlation. The audio signal can be used to drive one or more speakers of the device. Other aspects are described and claimed.

20 Claims, 7 Drawing Sheets

AUDIO-BASED PRESENCE DETECTION

RELATED APPLICATIONS

This application is a continuation of co-pending U.S. patent application Ser. No. 17/481,844, filed Sep. 22, 2021, which is a continuation of U.S. application Ser. No. 16/870, 752 filed May 8, 2020, now U.S. Pat. No. 11,146,909, which claims the benefit of and priority to U.S. Provisional Patent Application No. 62/850,332, filed May 20, 2019, which is hereby incorporated by this reference in its entirety.

FIELD

One aspect of the disclosure herein relates to detecting presence based on audio.

BACKGROUND

Devices can send audio signals to each other to facilitate communication between two or more users. For example, a second user can call a first user with a telephone or other device. The first user can accept the call with the first user's device and begin talking to the second user. In such a case, audio signals containing speech of the first and/or second user can be communicated back and forth between their respective devices.

SUMMARY

A process and system can if determine if two (or more) devices and users are within an audible zone (e.g., within the same room) based on audio. Based on whether the devices and users are within an audible zone, the devices can automatically modify the manner in which it processes audio. This can be beneficial for reasons discussed in the present disclosure.

For example, multiple users can be on a conference call with each other. In such a case, two or more users can be in communication with each other through, for example, mobile devices and/or headphone sets. At a first point in time, a second user can enter a building that a first user is in, both being on the same call. At some point during the call, the second user can enter the same room as the second user.

As the two users get closer, the first user may be able to hear voice of the second user directly through physical space (as well as through the first user's device). At this point, it may be desirable to turn down or turn off the second user's voice heard through speakers of the first user's device. Depending on the latency of the communication network, there can be a recognizable delay between the playback of the second user's speech through the first user's device and the arrival of the second user's speech to the first user's ears through physical space. This delay can create an unpleasant echo effect for the first user. Thus, it may be beneficial for the first user's mobile device to be able to detect the proximity of the second user and modify the processing of the audio signal (e.g., attenuate or 'turn off' the audio signal) coming from the second user, when it is determined that the first user is close enough to the second user that the first user can hear the second user through physical space.

One method for estimating when users and devices are within a physical proximity may be to analyze location data provided by GPS. Another method may be to detect the presence of a device through a wireless communication protocol. For example a device of the first user may check a local network to see if the device of the second user is on the same network (e.g., a local Wi-Fi network). Additionally or alternatively, the device of the first user can check whether it can 'connect' to the second user's device through a close-proximity protocol such as Bluetooth. These methods can be limiting in that the latency here may be too high to effectively modify a user's audio playback in a dynamic manner. Further, these methods rely on the second user's device to actively provide information electronically to communicate its whereabouts, e.g., through GPS, Wi-Fi or Bluetooth.

In one aspect of the present disclosure, a method for processing audio for a device, can include: receiving an audio signal that is used to drive one or more speakers of the device; determining a measure of correlation between a microphone signal and the audio signal; and attenuating the audio signal based on the measure of correlation between the microphone signal and the audio signal. A determination can be made that the second user is now within an audible range of the first user based on comparing the microphone signal to the received audio signal that is generated by the second user, without relying on the second user's device to communicate additional information (e.g., through GPS, Wi-Fi, or Bluetooth).

Referring back to the conference call example, the device of the first user can compare an audio signal received from the second user with a microphone signal of the first user's device (e.g., generated by a microphone on the first user's device). If the microphone signal and the audio signal correlate to each other, it can be assumed that the first user can hear the second user's voice in physical space.

Therefore, the first user's device can attenuate the audio signal received from the second user, for example, to a lower level or completely off. This can reduce the unpleasant echo effect felt by the first user, from hearing the second user from two sources that have a time delay (the first source being through physical space and the second source being through a communication network and through speakers of the first user's device). It should be noted that, although the example was given for a conference call, the methods and systems described in the present disclosure pertain also to one-on-one conversations such as, for example, a phone call or a video chat. Immersive virtual applications, e.g., a virtual conference call using a head-mounted display having speakers, can also implement aspects of the disclosure.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

System for Detecting Presence Based on Audio

Figure 1:
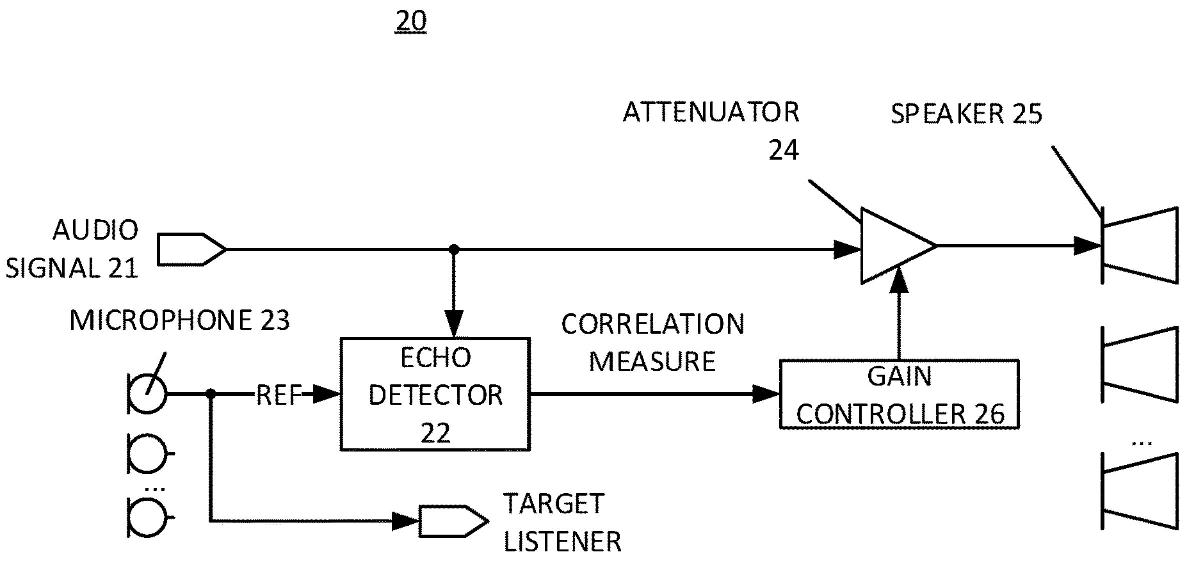
FIG. 1 illustrates a system for detecting presence based on audio, according to one aspect.

Referring now to FIG. 1, a system 20 that detects presence (e.g., of a user and/or device) based on audio is shown. The system can include mobile devices, such as but not limited to, a mobile phone, a laptop, a laptop tablet, a headphone set, a smart speaker, a head mounted display, ‘smart’ glasses, or other head-worn device. The devices can have speakers that are worn in-ear, over-ear, on-ear, or outside of the ear (e.g., bone conduction speakers).

In one aspect, a system or device 20 receives an audio signal 21 used to drive one or more speakers 25. The audio signal 21 can be received, for example, through a communication network and protocol (e.g., 3G, 4G, Ethernet, TCP/IP, and Wi-Fi). The audio signal can contain sounds (e.g., speech, dogs barking, a baby crying, etc.) sensed by a microphone of a second device.

The system can have a microphone 23 that senses sound in a user’s environment to generate a microphone signal. In one aspect, the microphone is physically fixed to and/or integrated with the system or device. Alternatively, the microphone can be located separate from the device if, for example, the audio processing is performed remotely (e.g., by a processor that is of a device that is separate from the speaker and/or the microphone). In one aspect, the microphone signals can be used to generate an audio signal that is sent to a target listener (e.g., to the second device, or the source of the audio signal) to facilitate a two-way communication.

An echo detector 22 can determine a measure of correlation between the one or more microphone signals and the audio signal 21. For example, the echo detector can calculate an impulse response (or transfer function) based on the microphone signal and the audio signal. The impulse response or transfer function can be calculated by using an optimization algorithm or cost function to adjust parameters of an adaptive filter. Given a reference signal, x (e.g., a microphone signal), and an input signal (e.g., the audio signal), y, that is assumed to be linearly related to the reference as $h*x+v$, an echo detector can use a known optimization method (e.g. least means squared (LMS)) to adaptively search for an estimate of the assumed transfer function, h', that minimizes the difference between $h'*x$ and y. Energy of the calculated impulse response (which can be calculated from the transfer function, and vice versa) can be used as a measure of correlation (e.g., the higher the energy of the calculated impulse response, the higher the measure of correlation between a) the microphone signal, and b) the audio signal).

In one aspect, microphone 23 can be one or more microphones. The microphones can each generate corresponding microphone signals which can each be used as a reference to echo detector 22. In one aspect, a measure of correlation is determined between each microphone signal and the audio signal, and the highest measure of correlation among those that are calculated is used to attenuate the audio signal. Thus, going back to the conference call example, if one mic of the first user’s device is in a better position than another mic to pick up the second user’s speech, this mic will be used to attenuate the audio signal.

In one aspect, a plurality of microphones can form one or more microphone arrays. One or more beamformed signals are produced with the microphone signals from the one or more microphone arrays through known beamforming techniques. The system can determine a measure of correlation between each beamformed signal and the audio signal. The highest measure of correlation can be used to attenuate the audio signal. Moreover, the direction associated with the beamformed signal having the highest measure of correlation can indicate a relative direction between system 20 and the source of the audio signal. This direction can be used to spatialize the audio signal output by speakers 25.

An attenuator 24 can attenuate the audio signal based on the measure of correlation between the microphone signal and the audio signal. For example, a gain controller 26 can use a lookup table, an algorithm, and/or a curve/profile to control the attenuation of the audio signal, based on the measure of correlation. The attenuation can be increased as the measure of correlation increases, (e.g., proportionately, or disproportionately). In one aspect, if a correlation threshold is satisfied, the attenuation can be increased gradually based on how much the correlation measure is above or below the threshold. In one aspect, if a correlation threshold is satisfied, the audio signal can be attenuated such that, when used to drive the speaker, the resulting audio is at an inaudible level.

In one aspect, the system can include a spatial renderer that spatializes the audio signal and spatialized audio signals are used to drive a plurality of speakers. Although not shown in FIG. 1, it should be understood that the spatial renderer can use a spatial filters to spatialize the attenuated version or the non-attenuated version of audio signals. As mentioned above, the direction of spatialization can be determined by identifying a beamformed microphone signal having the highest correlation with the audio signal 21.

Figure 2:
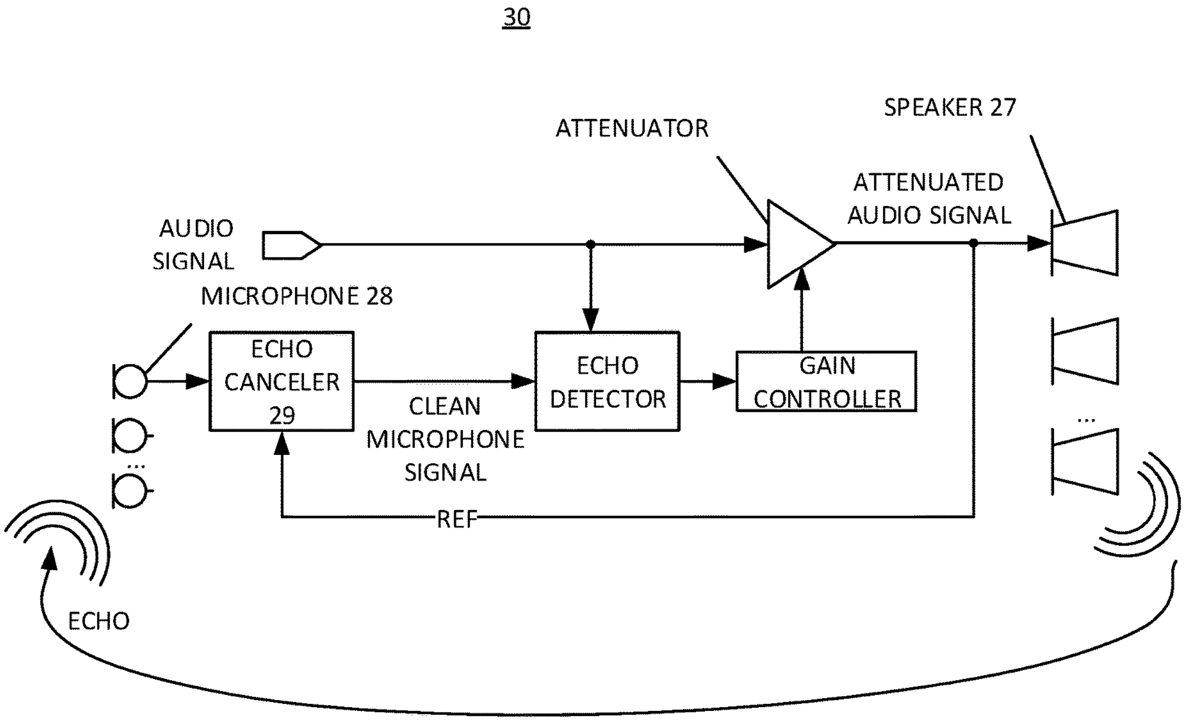
FIG. 2 illustrates a system with echo canceler for detecting presence based on audio, according to one aspect.
Figure 3:
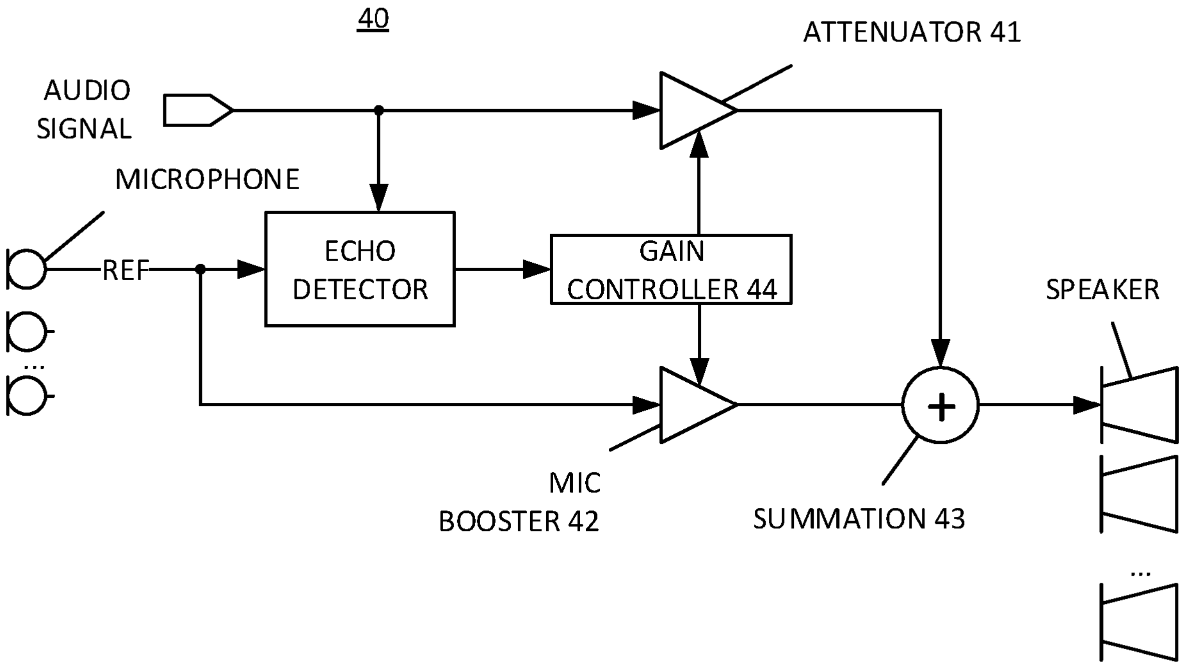
FIG. 3 illustrates a system with microphone-signal-driven-speakers for detecting presence based on audio, according to one aspect.

It should be understood that the audio signal, microphone, and speaker of FIGS. 1, 2 and 3, can be one or more audio signals, one or more microphones and microphone signals, and one or more speakers.

Echo Canceler

Referring now to FIG. 2, acoustic echo can arise if audio output by one or more of speakers 27 is inadvertently picked up by microphone(s) 28. This acoustic echo can interfere with determining the measure of correlation. In one aspect, an audio signal used to drive one of speakers 27 (e.g., an attenuated version of the audio signal) can be compared with the microphone signal to remove or reduce an amount of echo found in the microphone signal.

For example, a system 30 can include an echo canceler 29 that uses the audio signal driving the speaker as a reference to remove or reduce in a microphone signal, any audio components or 'echo' that is output by the speaker 27 and inadvertently picked up by the microphone 28. Echo cancellation can include determining an impulse response between the speaker 27 and the microphone 28 (e.g., using a finite impulse response filter (FIR)). Adaptive algorithms (e.g., least mean squared) can be used to determine the impulse response.

The resulting echo-canceled microphone signal can then be compared to the audio signal to determine the measure of correlation, as described in previous sections. This echo cancellation can remove echo caused by audio output of the speaker thereby providing a more accurate correlation of measure between the microphone signal and the audio signal.

Boosting Picked-Up Audio and Audio Transparency

Referring now to FIG. 3, a system 40 is shown for detecting presence based on audio. As described in other sections, the system can detect the presence of a user or device that is communicating audio to the system based on determining a measure of correlation between the received audio and a microphone signal. In this aspect, however, the microphone signal can be used to drive the speaker 27 instead of the audio signal, based on the measure of correlation.

In one aspect, if the measure of correlation (e.g. determined by the echo detector) satisfies a threshold criterion, then the gain controller 44 and attenuator 41 can attenuate the audio signal to an inaudible level over the one or more speakers (e.g., switch off the audio signal coming over a network). Rather than drive the speaker 27 with the received audio signal, the system can, instead, drive the speaker with the microphone signal. When the measure of correlation is not satisfied (e.g., a second user and device is not within physically audible range), then the mic signal can be attenuated (e.g., by mic booster 42) to an inaudible level or 'shut off' and the audio signal (received from the second user's device) will be used to drive the speaker.

In one aspect, a summation module 43 can add the audio signal and the mic signal. At the output of the summation module, if the threshold criterion is not satisfied, then the audio signal is used to drive the speaker, but if the threshold is satisfied, then the mic signal or a boosted mic signal is used. In one aspect, the mic booster 42 can boost the mic signal (e.g., by increasing a mic signal level with a gain) prior to driving the one or more speakers with the microphone signal.

In one aspect, the attenuator 41, mic booster 42, and summation module 43 can be a replaced by—or represented as—a double pole 'switch'. At a first stage where the measure of correlation does not satisfy a threshold criterion (e.g., the mic does not pick up speech that correlates to speech in the audio signal), the switch is configured to connect the audio signal to the speaker driver to drive the speaker. At a second stage, where the measure of correlation satisfies the threshold criterion, the switch position is changed so that the mic signal (or a boosted mic signal) drives the speaker instead of the audio signal. The mic signal can be boosted if the correlation is low, but still satisfies the threshold (e.g., the second user is close, but the speech of the second user through the mic signal is weak).

Figure 4:
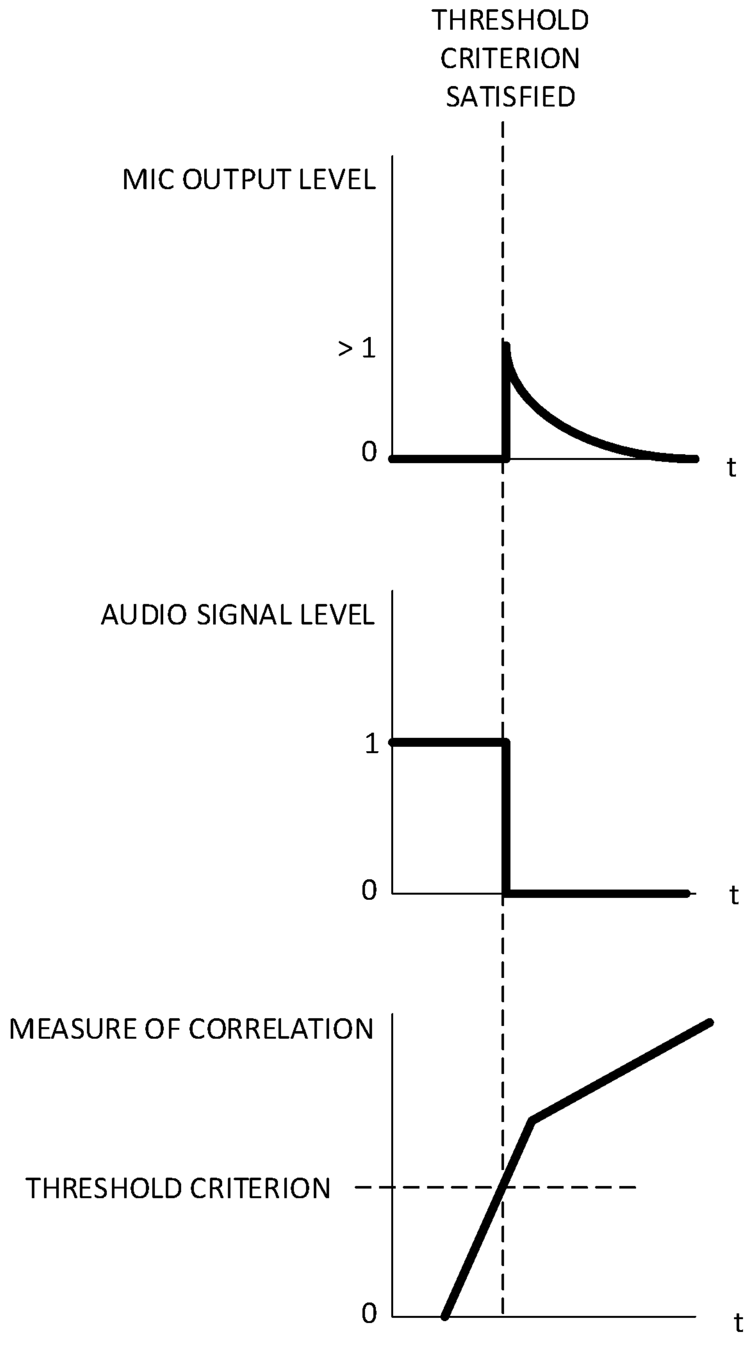
FIG. 4 illustrates audio signal output and mic signal output in relation to a measure of correlation, according to one aspect.

To further illustrate, FIG. 4 shows what can happen when a measure of correlation (e.g., an energy of an impulse response determined based on the mic signal and the audio signal) satisfies a threshold criterion (e.g., a threshold energy level). If a measure of correlation satisfies the threshold criterion, then a mic output, used as an input to the speaker, can be switched on. Even after the threshold is satisfied, the mic level can be tapered off (e.g. attenuated) as the correlation increases. This tapering off can transition the listener from a) mic-audio that is output through the speaker, to b) audio that is heard through physical space. Going back to the conference call example, if the second user keeps getting closer to the first user, then the mic output having speech of the second user can taper off accordingly because the first user can hear the second user more and more clearly through physical space.

Conversely, the audio signal received from the second user is used to drive the speakers of the first user's device prior to the threshold being satisfied. When the threshold is satisfied, however, then the audio signal can be attenuated to an inaudible level or 'shut off'.

The threshold criteria can be determined based on routine test and experimentation. For example, different thresholds can be tested in a device to determine which threshold reduces the echo effect effectively when two communicating users and devices come within human-audible range. Other tests can be performed as well.

Human detectable delays (e.g., approximately 300 ms) created by network latencies can be obviated and the first user can hear the second user clearly over the speaker and/or through physical space without echo. In contrast, delays between a) speech from the second user heard through the microphone-signal-driven speaker, and b) the speech from the second user through physical space, can be unnoticeable to the human ear (e.g., 10 ms or less).

In one aspect, the device is a headphone set, and the mic signal is boosted and played back on a speaker of the headphone set, e.g., audio transparency. Thus, based on the detected presence of a second user and second device, the headphone set can go into 'audio transparency' mode.

Process for Detecting Presence Based on Audio

Figure 5:
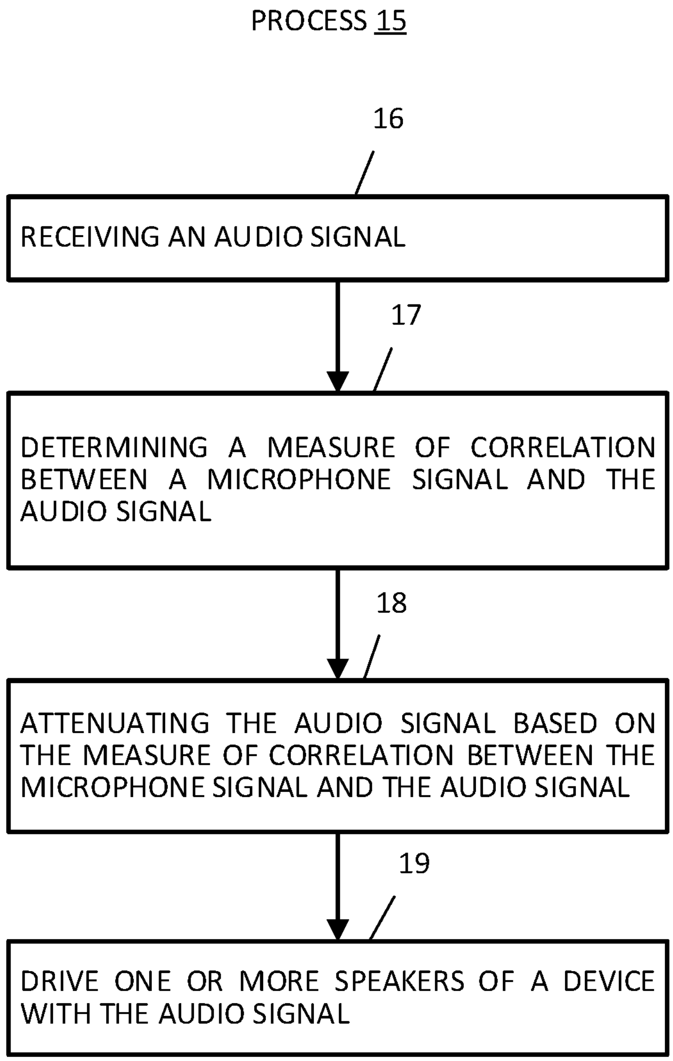
FIG. 5 illustrates a process for detecting presence based on audio, according to one aspect.

In one aspect, a process 15 for detecting presence based on audio is shown in FIG. 5. The process can be performed by one or more processors of one or more devices. At block 16 the process includes receiving an audio signal. It should be understood that rather than a single audio signal, multiple audio signals can be received.

At block 17, the process includes determining a measure of correlation between a microphone signal and the audio signal. The microphone signal can be generated by a microphone of a device that receives the audio signal. The same device can have onboard speakers that are driven with the audio signal. For example, a mobile phone can a) receive the audio signal, b) have a microphone that generates a microphone signal, and c) have speakers that are driven with the audio signal (or an attenuated version of it).

At block 18, the process includes attenuating the audio signal based on the measure of correlation between the microphone signal and the audio signal. The attenuating can be gradual, linear, or non-linear. At block 19, the process can include driving one or more speakers of a device with an attenuated version of the audio signal. The speakers can include electro-acoustic transducers that convert an electric signal to acoustic energy.

Figure 6:
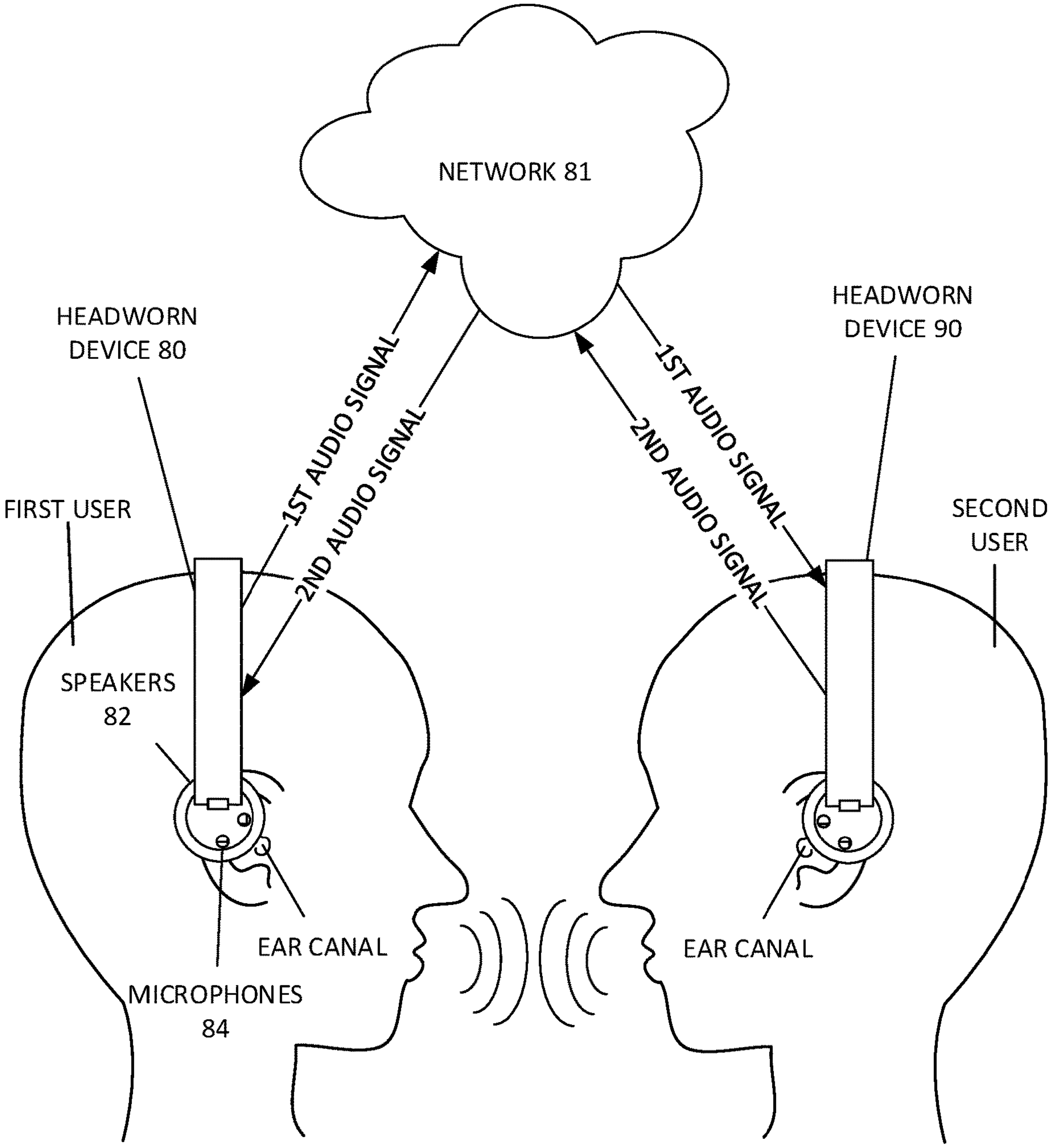
FIG. 6 illustrates a use case for detecting presence based on audio, according to one aspect.

To further illustrate the described aspects, devices 80 and 90 of FIG. 6 can communicate over a network 81. The network can be any combination of communication means including the internet, TCP/IP, Wi-Fi, Ethernet, Bluetooth, etc.

A first user wearing device 80 can communicate to the second user wearing device 90. One or more microphones 84 of device 80 can sense speech of the first user and other sounds physical environment. Data from the microphone signals of device 80 can be communicated to device 90 over a first audio signal. Similarly, the device 90 can have microphones and speakers and transmit a second audio signal to the first user and device 80. If the second user enters an audible range of the first user (e.g., enters a room that the first user is located), then microphones 84 of device 80 can pick up sounds in the shared environment and compare the mic signal or signals to the second audio signal coming from device 90 to determine a measure of correlation between the signals.

If the measure of correlation suggests that the first user can audibly hear the second user, then the device 80 of the first user can attenuate the second audio signal so that the first user can hear the second user naturally, through physical space. The sound picked up by the microphone 80 can be speech of the first user, speech of the second user, and other sounds in the environment such as a dog barking or a door slamming. Any of these sounds can be help determine the measure of correlation.

In one aspect, process 15 can be performed by a processor of a device that executes instructions stored in non-transitory computer readable memory. The device can be a headworn device or a system that includes a headworn device (e.g., a mobile phone attached to a headphone set).

It is recognized that in cases where a user's ears are completely covered, the user might not experience the echo effect. For example, going back to the conference call example, if the first user has on-ear or in-ear headphones that block the path of natural sound (e.g., sound from physical space) to the first user's ear canal, then the first user will not hear the second user even if the second user is in 'audible proximity' to the first user. Thus, the echo effect might not be an issue in the case of on-ear or in-ear headphones where there is a sealed enclosure over the user's ear.

In one aspect, the headworn device has a means to allow sound to propagate through physical space to a user's ear. For example, the device can have bone conduction speakers. In one aspect, the device does not have a sealed enclosure that fits over an ear of a user. In one aspect, the system or device does not include in-ear speakers. The system or device can include a headphone set with a physical opening between the user's ear canal and the user's physical environment. With such devices, the unpleasant echo effect described can be an issue.

In one aspect, multiple devices can be communicating with each other using the same process. Thus, in FIG. 6, both devices 80 and 90 can attenuate, respectively, the second audio signal and the first audio signal, when the measure of correlation suggests that the users are within audible range of each other.

Figure 7:
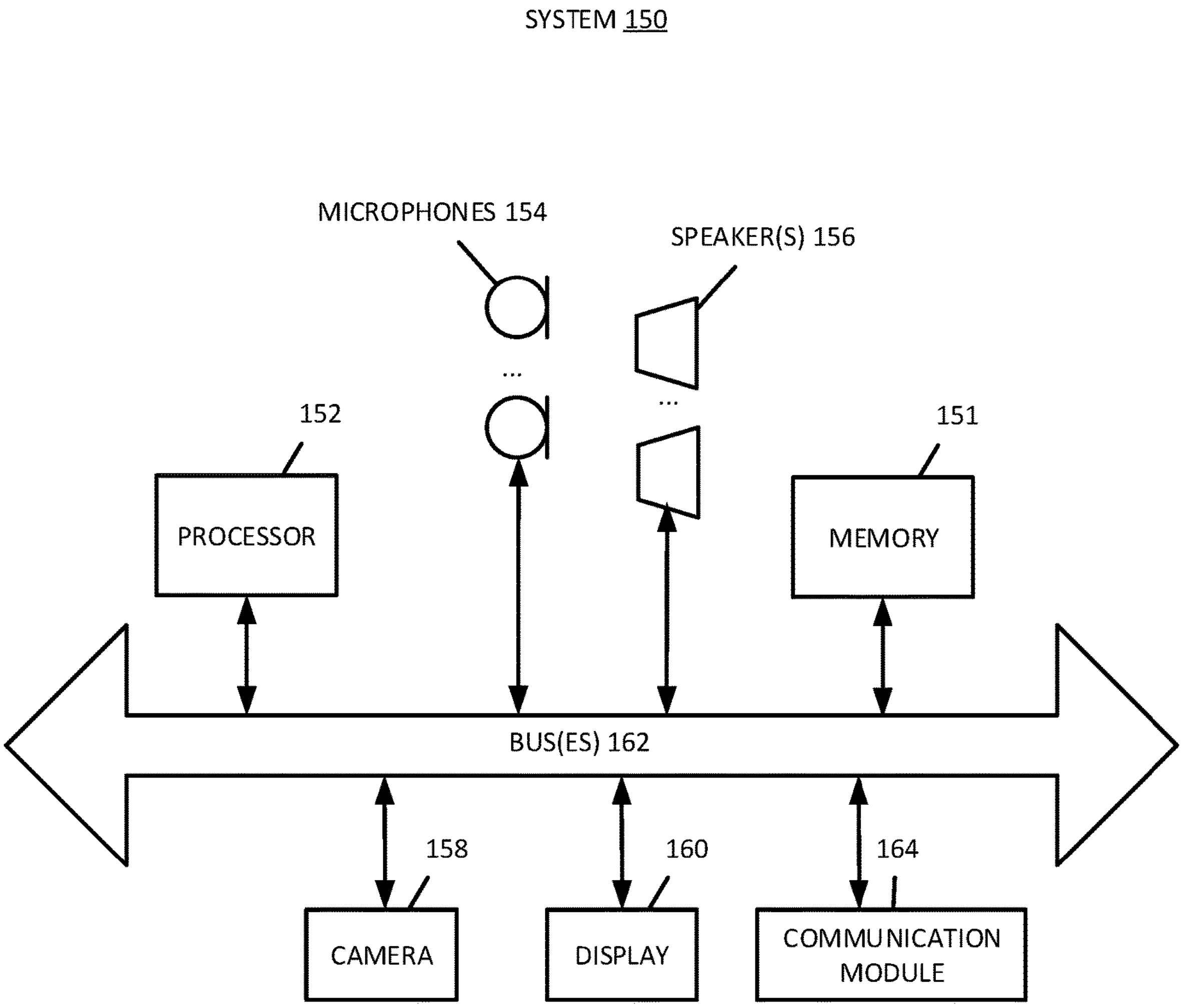
FIG. 7 illustrates an example of audio system hardware.

FIG. 7 shows a block diagram of audio processing system hardware, in one aspect, which may be used with any of the aspects described herein (e.g., headphone set, mobile device, media player, or television). This audio processing system can represent a general purpose computer system or a special purpose computer system. Note that while FIG. 7 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 7 is not intended to represent any particular architecture or manner of interconnecting the components as such details are not germane to the aspects herein. It will also be appreciated that other types of audio processing systems that have fewer components than shown or more components than shown in FIG. 7 can also be used. Accordingly, the processes described herein are not limited to use with the hardware and software of FIG. 7.

As shown in FIG. 7, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Camera 158 and display 160 can be coupled to the bus.

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms “analyzer”, “separator”, “renderer”, “estimator”, “combiner”, “synthesizer”, “controller”, “localizer”. “spatializer”, “component,” “unit,” “module,” “logic”, “extractor”, “subtractor”, “generator”, “optimizer”, “processor”, “mixer”, “detector”, “canceler”, and “simulator” are representative of hardware and/or software configured to perform one or more processes or functions. For instance, examples of “hardware” include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of “software” includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system’s registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. For example, the features relating to beamforming, multiple microphones, and spatializing that are described in relation to FIG. 1 can also be implemented in aspects described in relation to FIG. 2, and/or FIG. 3. Similarly, the echo cancelation of FIG. 2 can be implemented in the aspect shown in FIG. 3, as should be understood by one skilled in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words “means for” or “step for” are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method performed by a first electronic device, the method comprising:

receiving a microphone signal comprising sound captured by a microphone of a second electronic device during a wireless communication session with the first electronic device;

outputting the sound through a speaker of the first electronic device based on the received microphone signal at a sound output level;

determining that a distance between the first electronic device and the second electronic device is increasing; and increasing the sound output level as the distance between the first electronic device and the second electronic device increases.

2. The method of claim 1, wherein outputting the sound comprises using the received microphone signal with an applied gain to drive the speaker, wherein increasing the sound output level comprises:

determining a new gain based on the increasing distance between the first electronic device and the second electronic device; and applying the new gain to the received microphone signal.

3. The method of claim 1, wherein the microphone signal is a first microphone signal and the microphone is a first microphone, wherein the method further comprises receiving a second microphone signal captured by a second microphone of the first electronic device, wherein determining that the distance is increasing is based on a comparison between the first and second microphone signals.

4. The method of claim 1, wherein the sound comprises speech of a second user of the second electronic device, wherein the speaker is one of a plurality of speakers of the first electronic device, wherein the method further comprises determining, using a plurality of microphones of the first electronic device, a direction towards the speech of the second user with respect to the first electronic device, wherein outputting the sound comprises spatializing, through the plurality of speakers, the speech according to the direction.

5. The method of claim 1, wherein outputting the sound comprises using an audio signal that includes the sound and is based on the received microphone signal to drive the speaker, wherein the method further comprises:

determining that the distance between the first electronic device and the second electronic device has increased beyond a threshold; and in response, using the microphone signal to drive the speaker instead of the audio signal.

6. The method of claim 1, wherein the first electronic device is a headworn device that is configured to allow ambient sound of an environment in which the first electronic device is located to pass through at least a portion of the first electronic device and into an ear canal of a user while worn by the user.

7. The method of claim 1, wherein the first electronic device is a head-mounted display worn by a first user, and the wireless communication session is a virtual conference call between at least the first user and a second user of the second electronic device.

8. A first electronic device comprising:

a speaker;

at least one processor; and memory having stored therein instructions which when executed by the at least one processor causes the first electronic device to:

receive a microphone signal comprising sound captured by a microphone of a second electronic device during a wireless communication session with the first electronic device, play back the sound through the speaker based on the received microphone signal at a sound output level, determine that a distance between the first electronic device and the second electronic device is increasing, and increase the sound output level as the distance between the first electronic device and the second electronic device increases.

9. The first electronic device of claim 8, wherein the instructions to play back the sound comprises instructions to use the received microphone signal with an applied gain to drive the speaker, wherein the instructions to increase comprises instructions to:

determine a new gain based on the increasing distance between the first electronic device and the second electronic device; and apply the new gain to the received microphone signal.

10. The first electronic device of claim 8, wherein the instructions to play back comprises instructions to use an audio signal that includes the sound and is based on the received microphone signal to drive the speaker, wherein the memory has further instructions to:

determine that the distance between the first electronic device and the second electronic device has increased beyond a threshold; and in response, using the microphone signal to drive the speaker instead of the audio signal.

11. The first electronic device of claim 8, wherein the microphone signal is a first microphone signal and the microphone is a first microphone, wherein the memory has further instructions to receive a second microphone signal captured by a second microphone of the first electronic device, wherein the instructions to determine that the distance is increasing is based on a comparison between the first and second microphone signals.

12. The first electronic device of claim 8, wherein the sound comprises speech of a second user of the second electronic device, wherein the speaker is one of a plurality of speakers of the first electronic device, wherein the memory has further instructions to determine, using a plurality of microphones of the first electronic device, a direction towards the speech of the second user with respect to the first electronic device, wherein the instructions to play back the sound comprises spatializing, through the plurality of speakers, the speech according to the direction.

13. The first electronic device of claim 8 comprises a headworn device configured to allow ambient sound of an environment in which the first electronic device is located to pass through at least a portion of the first electronic device and into an ear canal of a user while worn by the user.

14. The first electronic device of claim 8 comprises a head-mounted display worn by a first user, and the wireless communication session is a virtual conference call between at least the first user and a second user of the second electronic device.

15. A non-transitory machine-readable medium having stored therein instructions which when executed by at least one processor of a first electronic device:

receive a microphone signal comprising sound captured by a microphone of a second electronic device during a wireless communication session with the first electronic device;

output the sound through a speaker of the first electronic device based on the received microphone signal at a sound output level;

determine that a distance between the first electronic device and the second electronic device is increasing; and increase the sound output level as the distance between the first electronic device and the second electronic device increases.

16. The non-transitory machine-readable medium of claim 15, wherein the instructions to output the sound comprises instructions to use the received microphone signal with an applied gain to drive the speaker, wherein the instructions to increase the sound output level comprises instructions to:

determine a new gain based on the increasing distance between the first electronic device and the second electronic device; and apply the new gain based to the received microphone signal.

17. The non-transitory machine-readable medium of claim 15, wherein the microphone signal is a first microphone signal and the microphone is a first microphone, wherein the non-transitory machine-readable medium comprises further instructions to receive a second microphone signal captured by a second microphone of the first electronic device, wherein the instructions to determine that the distance is increasing is based on a comparison between the first and second microphone signals.

18. The non-transitory machine-readable medium of claim 15, wherein the sound comprises speech of a second user of the second electronic device, wherein the speaker is one of a plurality of speakers of the first electronic device, wherein the non-transitory machine-readable medium comprises further instructions to determine, using a plurality of microphones of the first electronic device, a direction towards the speech of the second user with respect to the first electronic device, wherein the instructions to output the sound comprises instructions to spatialize, through the plurality of speakers, the speech according to the direction.

19. The non-transitory machine-readable medium of claim 15, wherein the instructions to output comprises instructions to use an audio signal that includes the sound and is based on the received microphone signal to drive the speaker, wherein the non-transitory machine-readable medium further comprises:

determine that the distance between the first electronic device and the second electronic device has increased beyond a threshold; and in response, use the microphone signal to drive the speaker instead of the audio signal.

20. The non-transitory machine-readable medium of claim 15, wherein the first electronic device is a headworn device that is configured to allow ambient sound of an environment in which the first electronic device is located to pass through at least a portion of the first electronic device and into an ear canal of a user while worn by the user.

* * * * *